US011836404B2

(12) United States Patent
Igarashi

(10) Patent No.: US 11,836,404 B2
(45) Date of Patent: Dec. 5, 2023

(54) PRINT MANAGEMENT SYSTEM AND METHOD FOR MANAGING SETTINGS FOR A PRINT APPARATUS AND REGISTERS THE PRINT APPARATUS ASSOCIATED WITH AN ACCOUNT AND FURTHER TRANSMITS FIRST INFORMATION TO THE PRINT APPARATUS IF THE PRINT APPARATUS IS REGISTERED

(71) Applicant: CANON KABUSHIKI KAISHA, Tokyo (JP)

(72) Inventor: Toshiaki Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/181,407

(22) Filed: Mar. 9, 2023

(65) Prior Publication Data
US 2023/0297300 A1  Sep. 21, 2023

(30) Foreign Application Priority Data

Mar. 17, 2022 (JP) .................................. 2022-042416

(51) Int. Cl.
*G06F 3/12* (2006.01)

(52) U.S. Cl.
CPC .......... *G06F 3/1231* (2013.01); *G06F 3/1222* (2013.01); *G06F 3/1285* (2013.01); *G06F 3/1232* (2013.01); *G06F 3/1255* (2013.01)

(58) Field of Classification Search
None
See application file for complete search history.

(56) References Cited

U.S. PATENT DOCUMENTS

| 9,955,035 B2* | 4/2018 | Inoue ................ H04N 1/32117 |
| 11,182,118 B2 | 11/2021 | Sato | |
| 2015/0002884 A1* | 1/2015 | Okumura .............. G06F 3/1204 358/1.14 |
| 2018/0181352 A1* | 6/2018 | Saito ..................... G06F 3/1288 |
| 2018/0181407 A1* | 6/2018 | Rothman .............. G06F 1/3296 |
| 2020/0301639 A1* | 9/2020 | Ren ....................... G06F 3/1271 |
| 2020/0364018 A1 | 11/2020 | Sato | |

FOREIGN PATENT DOCUMENTS

JP          2020185730 A     11/2020

* cited by examiner

*Primary Examiner* — Haris Sabah
(74) *Attorney, Agent, or Firm* — Canon U.S.A., Inc. IP Division

(57) ABSTRACT

A print management system transmits first setting information as setting information to be applied to a print apparatus to the print apparatus in a case where an identifier included in a registration request for registration of the print apparatus is registered in association with an account when the registration request is made, and the print management system transmits second setting information as the setting information to be applied to the print apparatus to the print apparatus in a case where the identifier is unregistered.

5 Claims, 12 Drawing Sheets

FIG. 5A

AUTHENTICATION INFORMATION MANAGEMENT TABLE ~ 510

| ACCOUNT | BELONGING TENANT | USER NAME | ROLE | PASSWORD |
|---|---|---|---|---|
| CPSADMIN |  | CPS ADMIN | CPS ADMIN | xxxx |
| user1@tenant1 | TENANT1 | USER1 | ADMIN | xxxx |
| user2@tenant1 | TENANT1 | USER2 | GENERAL | xxxx |
| user3@tenant2 | TENANT2 | USER3 | ADMIN | xxxx |

FIG. 5B

SETTING INFORMATION MANAGEMENT TABLE ~ 530

| ID | BELONGING TENANT | SETTING NAME | FW AUTOMATIC UPDATE FUNCTION | MEMORY MONITORING | PW PROTECTION | PERSONAL AUTHENTICATION | HOLD PRINTING | CPS PRINT ONLY |
|---|---|---|---|---|---|---|---|---|
| 0 |  | S0 |  |  |  | ON | ON | ON |
| 1 | TENANT1 | S1 | ON | ON | ON | ON |  | ON |
| 2 | TENANT1 | S2 | ON | OFF | ON | OFF |  | OFF |
| 3 | ... | ... | ... | ... | ... | ... | ... | ... |

FIG. 5C

SERIAL NUMBER MANAGEMENT TABLE ~ 550

| SERIAL NUMBER | BELONGING TENANT | REGISTRATION ATTRIBUTE |
|---|---|---|
| SN11 | TENANT1 | COMPANY |
| SN12 | TENANT1 | INDIVIDUAL |
| SN21 | TENANT2 | COMPANY |
| SN31 | TENANT3 | COMPANY |

FIG. 5D

SETTING INFORMATION ALLOCATION TABLE ~ 570

| BELONGING TENANT | REGISTRATION ATTRIBUTE | SETTING INFORMATION |
|---|---|---|
| TENANT1 | COMPANY | 0, 1 |
| TENANT1 | INDIVIDUAL | 2 |
| TENANT2 | COMPANY | x |
| TENANT2 | INDIVIDUAL | y |
| ... | ... | ... |

FIG. 7A

```
                                                    700
┌─────────────────────────────────────────────────────┐
│ SETTING INFORMATION EDIT                            │
│     BELONGING TENANT : TENANT1 —701                 │
│     SETTING NAME :              [    S1    ]—702    │
│ ─────────────────────────────────────────────────── │
│     ☑ FW AUTOMATIC UPDATE FUNCTION : [ ON  ▼]—703   │
│     ☑ MEMORY MONITORING :            [ ON  ▼]—704   │
│     ☑ PW PROTECTION :                [ ON  ▼]—705   │
│     ☑ PERSONAL AUTHENTICATION :      [ ON  ▼]—706   │
│     ☐ HOLD PRINTING :                [ OFF ▼]—707   │
│     ☑ CPS PRINT ONLY :               [ ON  ▼]—708   │
│ ─────────────────────────────────────────────────── │
│                                  [ OK ]  [ CANCEL ] │
└─────────────────────────────────────────────────────┘
                                     709     710
```

FIG. 7B

```
                              720
┌──────────────────────────────┐
│ DEVICE INFORMATION REGISTRATION │
│ BELONGING TENANT : TENANT1 —721 │
│ SERIAL NUMBER : [  SN11  ]      │
│                        722      │
│ ─────────────────────────────── │
│           [ OK ]  [ CANCEL ]    │
└──────────────────────────────┘
            723       724
```

FIG. 7C

```
                                 740
┌─────────────────────────────────┐
│ SETTING INFORMATION ALLOCATION  │
│  BELONGING TENANT : TENANT1 —741│
│  REGISTERED SETTING INFORMATION │
│   COMPANY DEVICE :  [ S0, S1 ]—742│
│   PERSONAL DEVICE : [   S2   ]—743│
│ ─────────────────────────────── │
│           [ OK ]  [ CANCEL ]    │
└─────────────────────────────────┘
            744       745
```

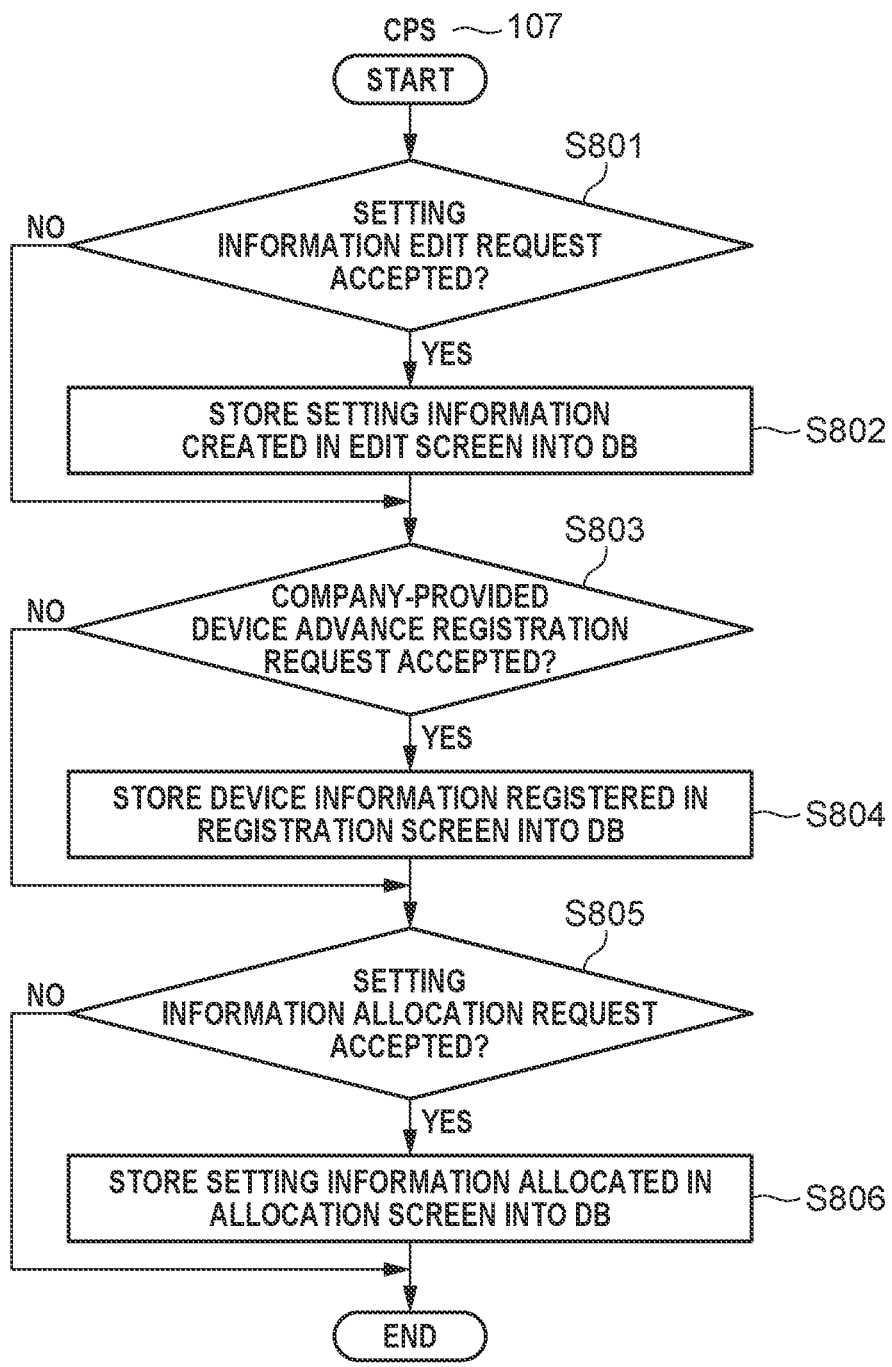

FIG. 11A

SECURITY FUNCTION TABLE ～ 1100

| MODEL ID | FW PROTECTION | FW AUTOMATIC UPDATE FUNCTION | PW PROTECTION | PORT CONTROL |
|---|---|---|---|---|
| MODEL1 | AVAILABLE | AVAILABLE | AVAILABLE | AVAILABLE |
| MODEL2 | NOT AVAILABLE | NOT AVAILABLE | AVAILABLE | AVAILABLE |
| MODEL3 | NOT AVAILABLE | NOT AVAILABLE | NOT AVAILABLE | AVAILABLE |

INDISPENSABLE FUNCTION TABLE ～ 1120

| BELONGING TENANT | FW PROTECTION | FW AUTOMATIC UPDATE FUNCTION | PW PROTECTION | PORT CONTROL |
|---|---|---|---|---|
| TENANT1 | NOT APPLICABLE | APPLICABLE | APPLICABLE | APPLICABLE |
| TENANT2 | NOT APPLICABLE | APPLICABLE | APPLICABLE | NOT APPLICABLE |
| TENANT3 | NOT APPLICABLE | APPLICABLE | NOT APPLICABLE | APPLICABLE |

MODEL ID CORRESPONDENCE TABLE ～ 1140

| MODEL ID | SERIAL NUMBER RANGE |
|---|---|
| MODEL1 | SN1~SN1000 |
| MODEL2 | SN1001~SN2000 |
| MODEL3 | SN2001~SN3000 |

(1141) (1142)

PRINT MANAGEMENT SYSTEM AND METHOD FOR MANAGING SETTINGS FOR A PRINT APPARATUS AND REGISTERS THE PRINT APPARATUS ASSOCIATED WITH AN ACCOUNT AND FURTHER TRANSMITS FIRST SETTING INFORMATION TO THE PRINT APPARATUS IF THE PRINT APPARATUS IS REGISTERED

BACKGROUND

Field of the Disclosure

The present disclosure relates to a technique for managing settings for a print apparatus when the print apparatus is used for work such as remote work.

Description of the Related Art

There has been proposed a cloud print service (hereinafter referred to as CPS) using a cloud service provided on the Internet lately. In such a print system, first, the administrator of a tenant (a unit of user group) of the CPS registers information about a network device such as a print apparatus or a multifunction peripheral with the tenant to which the administrator belongs. Subsequently, the administrator sets which user is to be permitted to use the device. The user permitted to use the device inputs a print job from a client terminal to the CPS. The CPS then stores the received print job in a storage service. The print apparatus acquires data stored in the CPS, as a print job, and prints the acquired data.

There are mainly two methods as a method for acquiring a print job stored in the CPS and printing the acquired print job by the print apparatus: "pull method" and "push method". In the pull method, when the print apparatus transmits an event acquisition request to the CPS, a print job notification arrives in response to this request. On the other hand, in the push method, once the print apparatus transmits a print job acquisition request upon establishing connection with the CPS, each time a print job is generated, the CPS transmits the print job to the print apparatus via the connection.

Japanese Patent Application Laid-Open No. 2020-185730 discusses a form of appropriately using these two methods, depending on settings about communications with a CPS made in a device.

In recent years, a working style called remote work, or working outside an office, has been spreading with more diversity of working style. For this working style, a print apparatus is provided by a company to print business documents at home in some cases. The print apparatus provided by the company is to connect to a CPS with which the company has contracted.

However, not all companies can provide all employees at remote work with print apparatuses, and there could be a case where a user uses a print apparatus of his or her own in connection with the CPS in remote work.

It is desirable that the company applies the same settings as settings in a print apparatus installed in the company or provided by the company to the user's print apparatus, when the user's print apparatus, which is also used for work, is connected to the CPS. The settings include a setting about security. However, this can cause inconvenience when the print apparatus is used as a personal device.

SUMMARY

According to an aspect of the present disclosure, a print management system includes a receiving unit configured to receive a registration request for registration of a print apparatus, including an identifier for identifying the print apparatus, from an information processing apparatus, a registration unit configured to register, in a case where the identifier included in the registration request is unregistered in association with an account through which the registration request has been made, the identifier with a database in association with the account, a receiving unit configured to receive a request including the identifier for identifying the print apparatus from the print apparatus, and a transmission unit configured to transmit first setting information as setting information to be applied to the print apparatus to the print apparatus, in a case where the identifier included in the registration request is registered in association with the account when the registration request is made. In a case where the identifier included in the registration request is unregistered in association with the account when the registration request is made, the transmission unit transmits second setting information different from the first setting information as the setting information to be applied to the print apparatus to the print apparatus.

Further features of various embodiments will become apparent from the following description of exemplary embodiments with reference to the attached drawings.

BRIEF DESCRIPTION OF THE DRAWINGS

FIGS. 5A to 5D each illustrate the configuration of a table managed in a CPS according to the first exemplary embodiment.

FIGS. 7A to 7C each illustrate an example of a user interface (UI) screen of the CPS according to the first exemplary embodiment.

FIG. 8 is a flowchart illustrating advance preparation processing of the CPS according to the first exemplary embodiment.

FIGS. 11A to 11C each illustrate the configuration of a table managed in a CPS according to a second exemplary embodiment.

DESCRIPTION OF THE EMBODIMENTS

Exemplary embodiments of the present disclosure will be described below with reference to the drawings.

Figure 1:
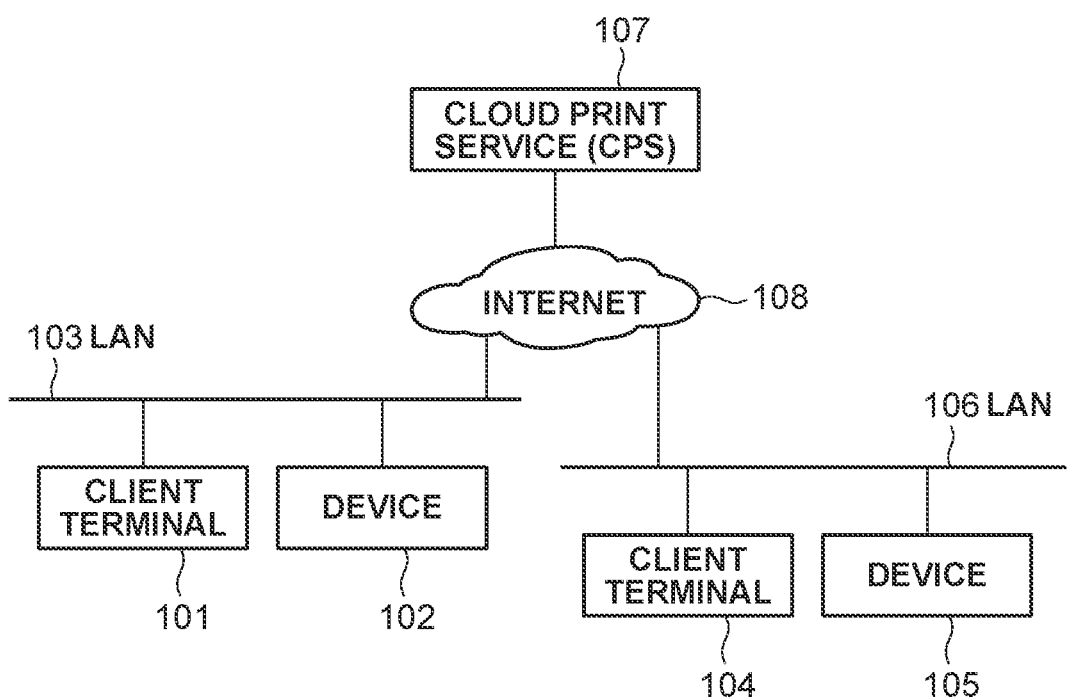
FIG. 1 illustrates an example of the configuration of a network system according to a first exemplary embodiment.

FIG. 1 illustrates the configuration of a system of a first exemplary embodiment. FIG. 1 illustrates a client terminal 101 and a device 102 such as a print apparatus. In the present exemplary embodiment, a personal computer (PC) or a mobile device is used as an example of the client terminal 101, but the client terminal 101 is not limited thereto. Examples of the print apparatus include a multifunction peripheral (MFP) provided with a scan function and a network communication function as well as a print function, a copier, and a three-dimensional printer. The client terminal 101 and the device 102 are connected to a local area network (LAN) 103. Similarly, a client terminal 104 and a device 105 are connected to a LAN 106.

A cloud print service (CPS) 107 receives a print job from the client terminal 101 or 104, and stores the received print job. The devices 102 and 105 each acquire a stored print job and perform print processing. Each of the devices connected to the LAN 103 and the LAN 106 is connected to the CPS 107 via the Internet 108.

Further, the CPS 107 separates information about users and devices into individual tenants and manages the pieces of separated information, and the CPS 107 also operates as a print management system that provides a service to manage settings to be applied to each device. A print job received by the CPS 107 is stored in a storage area dedicated to each tenant.

A print job stored for a tenant can be referred to by a user and a device each having the right to access the tenant. For example, if the client terminal 101 and the device 102 belong to a tenant1, and the client terminal 104 and the device 105 belong to a tenant2, then on the CPS 107, the client terminal 101 and the device 102 cannot access a print job of the tenant2. Similarly, the client terminal 104 and the device 105 cannot access a print job of the tenant1. It is also possible to separate a print service and a management service of the CPS 107, and separately prepare a print management system on the cloud.

Figure 2A:
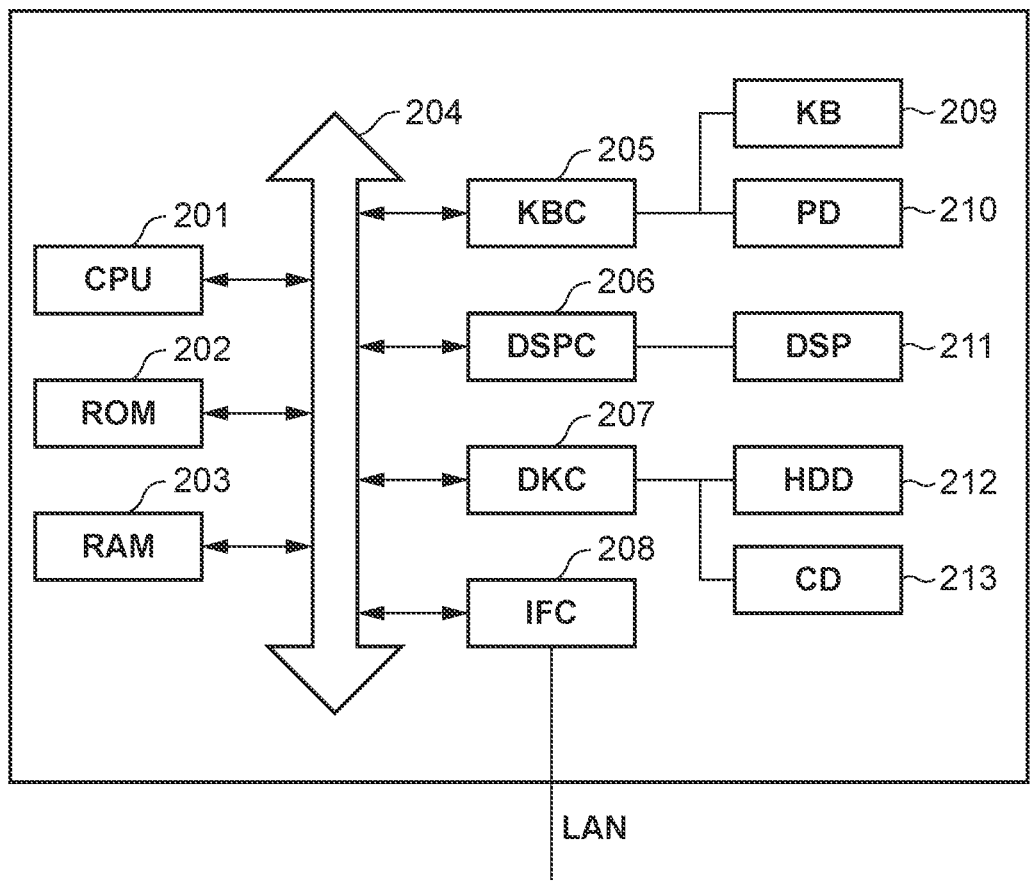
FIG. 2A is a hardware block diagram illustrating an information processing apparatus.

FIG. 2A is a block diagram illustrating an example of the hardware configuration of an information processing apparatus. Examples of the information processing apparatus in the present exemplary embodiment include a real server apparatus including the client terminal 101 and a real server apparatus including the CPS 107. The CPS 107 can be configured to operate on a virtual computer created by using hardware resources of an information processing apparatus in a datacenter.

A hard disk drive (HDD) 212 stores a program (e.g., a CPS program in the CPS 107) according to the present exemplary embodiment that is an operation entity throughout the description to be provided below.

A central processing unit (CPU) 201 is an execution entity as hardware throughout the description to be provided below, unless otherwise specified. Meanwhile, the control entity as software is the programs stored in the HDD 212.

A read only memory (ROM) 202 stores a basic input/output system (BIOS) and a boot program. A random access memory (RAM) 203 functions as a main memory and a work area of the CPU 201. A keyboard controller (KBC) 205 controls instructions input from devices such as a keyboard (KB) 209 and a pointing device (PD) 210. A display controller (DSPC) 206 controls display on a display (DSP) 211. A disk controller (DKC) 207 controls access to storage devices such as the HDD 212 and a compact disc (CD) 213 that is a CD-ROM. The HDD 212, the CD 213, and other storage devices store programs and data related to them, such as a boot program, an operating system, a database, and the CPS program. An interface controller (IFC) 208 transmits and receives information to and from other network devices via a LAN or another network. Each of these components is on a system bus 204.

A program according to the present exemplary embodiment can be supplied from a storage medium, such as a CD-ROM, in which the program is stored. In that case, the program is read out from a storage medium, such as the CD 213 illustrated in FIG. 2A, and is installed on the HDD 212.

Figure 2B:
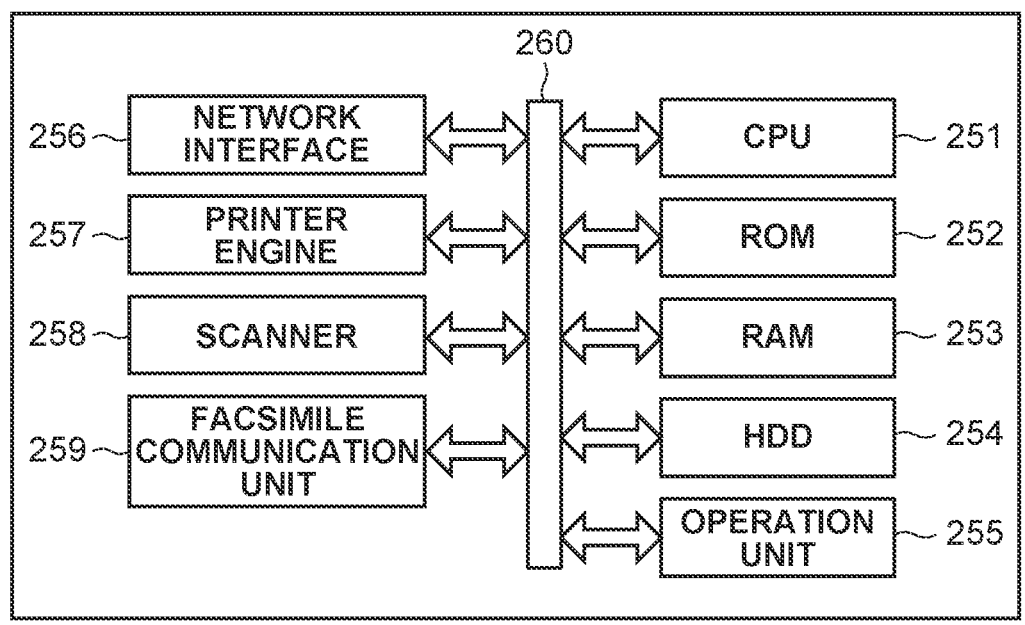
FIG. 2B is a hardware block diagram illustrating a multifunction peripheral.

FIG. 2B illustrates the internal configuration of an MFP used as an example of the device 102.

A CPU 251 is responsible for the general control of the MFP, and a ROM 252 stores information, such as a serial number. The serial number is an identifier prepared to identify a device. A RAM 253 is used for a work area of the CPU 251, a reception buffer, and image rendering. An HDD 254 stores firmware, an expansion program, font data, and the like. An operation unit 255 consists of various switches and buttons as well as a liquid crystal display unit for displaying messages. A network interface 256 is provided for connection to a network, and transmits and receives information to and from other network devices via a LAN. A printer engine 257 performs printing on recording paper, a scanner 258 is provided to read original documents, and a facsimile communication unit 259 is provided to perform facsimile transmission and reception. Each of these components is on a system bus 260. A print apparatus not having functions for scanner and facsimile and a copier not having a function for facsimile are apparatuses each having some of these components.

Figure 3:
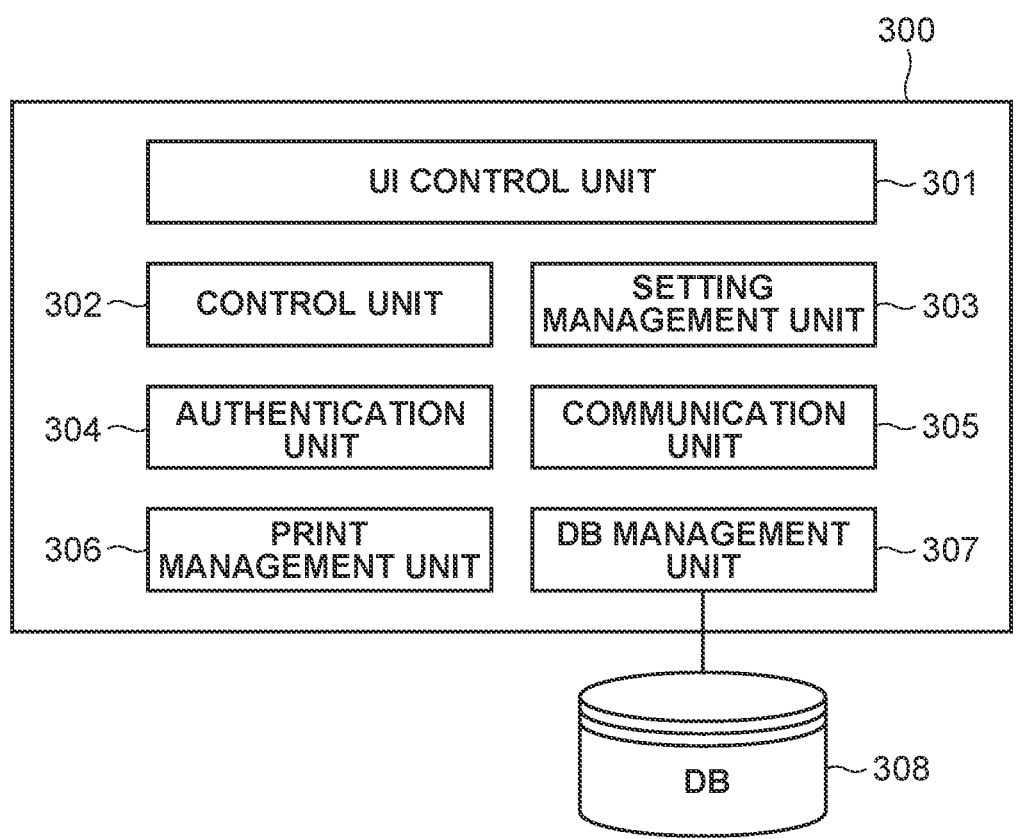
FIG. 3 is a software block diagram illustrating a cloud print service (CPS).

FIG. 3 illustrates an example of the functional configuration of a CPS program 300 running on the CPS 107.

The CPU 201 runs the program according to the present exemplary embodiment, so that each function illustrated in FIG. 3 is carried out.

A user interface (UI) control unit 301 provides a graphical user interface for a user to operate this program. The graphical user interface is configured as web pages that can be displayed at another client terminal, using Hypertext Transfer Protocol (HTTP). The graphical user interface can be configured to be displayed on the DSP 211 provided in the CPS 107.

A control unit 302 instructs each function in the CPS program 300 to perform various types of processing, based on instructions from the UI control unit 301 and requests received by a communication unit 305.

A setting management unit 303 stores various types of setting information about the CPS 107 and information about an MFP registered with the CPS 107 into a database (DB) 308, and controls the stored information.

An authentication unit 304 performs authentication processing for a user who has made a log-in request to the CPS 107, using user information for each tenant stored in the DB 308.

The communication unit 305 receives a request from the client terminal 101, the device 102, or the like via the IFC 208, and transmits the content of the request to the control unit 302. Further, the communication unit 305 receives a processing result from the control unit 302 for the request, creates data as a response to this request, and transmits the response to a request transmission source. Furthermore, the communication unit 305 controls HTTP communication and transmits a web page received from the UI control unit 301 to a client terminal, as appropriate.

A print management unit 306 stores a print job received from the client terminal 101 into the DB 308. Further, the print management unit 306 performs image processing, such as rendering for the print job. The rendering can be performed in cooperation with another piece of hardware. Furthermore, the print management unit 306 aggregates use situations about print, such as the use record and the number of sheets monthly printed by a user, into the DB 308.

A DB management unit 307 instructs the DB 308 to perform storage, deletion, update, and acquisition processing for various types of settings, user information, and print jobs, based on instructions from the control unit 302. Further, the DB management unit 307 manages various types of tables used by the CPS program 300.

The DB 308 is a database holding various types of data and various types of tables. The data held by the DB 308 is managed for each tenant. A user is permitted to access data for the tenant to which the user belongs, and is not permitted to access data for other tenants.

Figure 4:
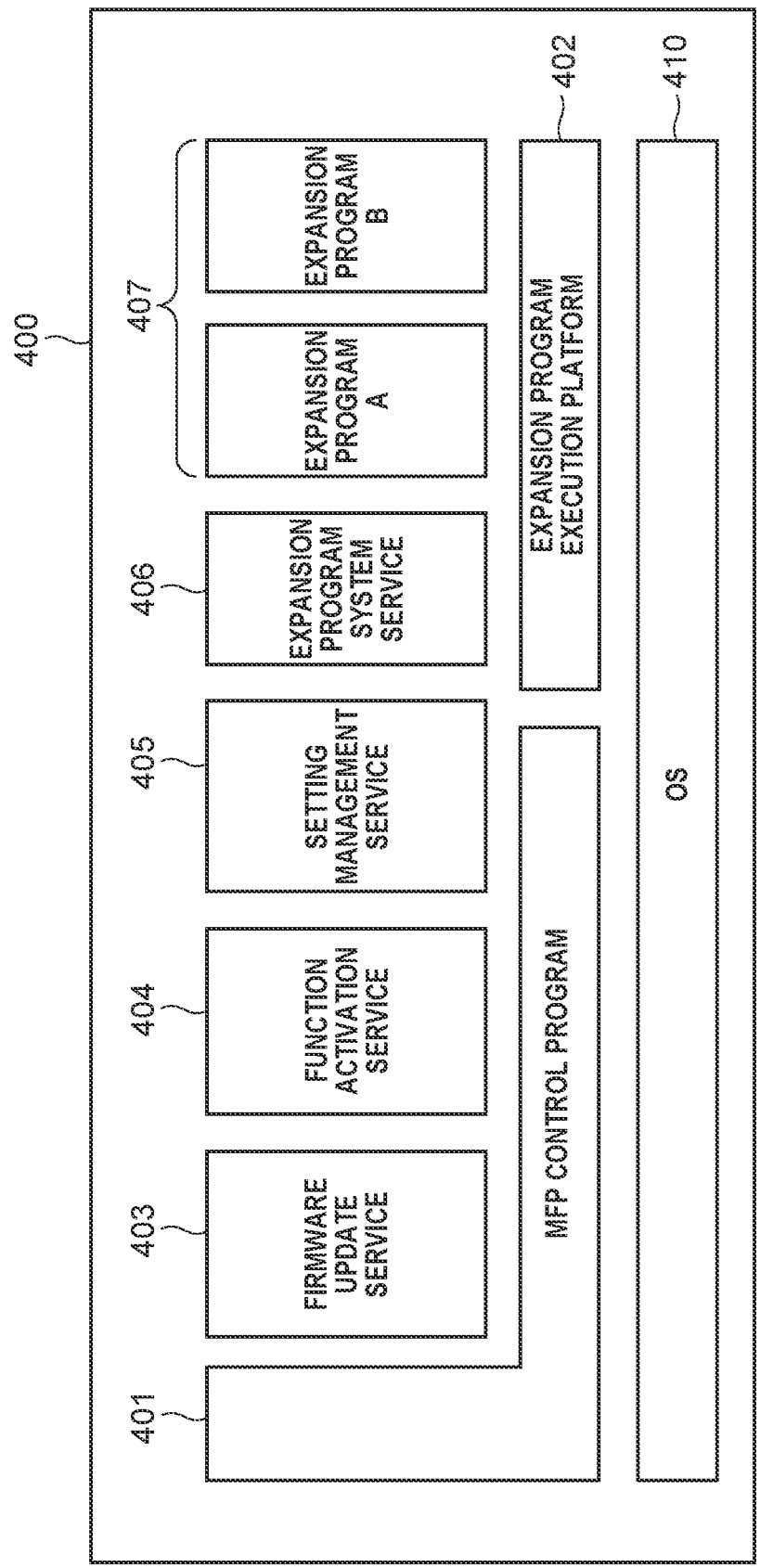
FIG. 4 illustrates a software configuration of the multifunction peripheral.

FIG. 4 illustrates an example of a software configuration of the MFP.

In MFP software 400 of the MFP, an MFP control program 401 consisting of originally-provided control programs for printer, facsimile, and scanner operates on an operating system (OS) 410. Further, an expansion program execution platform 402 that is a platform for running an expansion program also operates. Furthermore, a firmware update service 403, a function activation service 404, and a setting management service 405 operate on the MFP control program 401. Moreover, an expansion program system service 406 and an expansion program 407 operate on the expansion program execution platform 402.

The firmware update service 403 is a service that provides various types of functions for updating firmware. For example, the firmware update service 403 refers to firmware designated by a user, and determines whether this firmware of the MFP is to be updated. Further, the firmware update service 403 updates firmware via the MFP control program 401.

The function activation service 404 is a service for activating a function incorporated beforehand in the MFP control program 401. The function activation service 404 identifies a function specified by a function license file designated by a user, and activates the identified function.

The setting management service 405 is a service for managing various types of setting information for a printer, a scanner, and other devices. The setting management service 405 includes a UI, and a user can give an instruction to change a setting via the operation unit 255 of the MFP. The setting management service 405 also provides a function of rewriting the setting information about the MFP control program 401, when a setting information file is designated by a user. The setting information file includes a security setting to be described below.

The expansion program system service 406 is a utility library commonly useful for expansion programs, and is provided from the system. Work for developing an expansion program can be omitted by calling the function of the expansion program system service 406 from the expansion program 407.

The expansion program 407 can access each module of the MFP including the other expansion program 407, via either the expansion program execution platform 402 or the expansion program system service 406. In addition, the expansion program 407 provided with a UI can display icons on a main menu screen displayed on the operation unit 255 of the MFP. When a user selects an icon, the operation unit 255 transmits this selection to the CPU 251. Afterward, the CPU 251 displays the UI of the expansion program 407 selected by the user, on the operation unit 255.

This software configuration described here is a basic portion, but may include other services depending on an implementation environment. An unnecessary service may be removed for a reason such as placing a limitation on setting.

FIGS. 5A to 5D each illustrate an example of a table managed in the CPS 107. A table configuration in each of FIGS. 5A to 5D is an example, and a table configuration different from this example may be used.

FIG. 5A illustrates an authentication information management table 510, and consists of columns 511 to 516. One record represents one piece of authentication information.

The column 511 is an account column, and stores an account that is an identification (ID) for uniquely identifying a user who accesses the CPS 107. The column 512 is a belonging tenant column, and stores information about a tenant to which a user corresponding to the account in the account column 511 belongs. The column 513 is a user name column, and stores the name of the user identified by the account in the account column 511. The column 514 is a role column, and stores a role allocated to the account in the account column 511.

In the present exemplary embodiment, "admin" expressing a user having administrator privilege in a tenant and "general" expressing a general user are listed as examples of the role, but the role is not limited thereto. Further, at least one account having the "admin" role belongs to each tenant.

The column 515 is a password column, and stores a password to be input when the user corresponding to the account in the account column 511 logs in to the CPS 107.

The authentication information about the first record in this table indicates the account of an administrator of the overall CPS 107. This can be determined from a blank cell in the belonging tenant column 512 and a special role (in the present exemplary embodiment, "CPS admin") stored in the role column 514.

FIG. 5B illustrates a setting information management table 530, and consists of columns 531 to 539. One record represents one piece of setting information. In the present exemplary embodiment, this setting information mainly consists of security settings, but is not limited thereto.

The column 531 is an ID column, and stores an ID for uniquely identifying setting information. In the present exemplary embodiment, numbers starting from 0 are stored, but the IDs stored in this column are not limited thereto. The column 532 is a belonging tenant column. The belonging tenant column 532 stores a value representing a tenant to which each piece of setting information belongs. The column 533 is a setting name column, and stores the name of the setting information.

In particular, security setting items are listed as examples of the setting information in the columns 534 to 539. Further, the setting information is not limited to these examples.

Here, the column 539 indicating "CPS print only" will be specifically described. This setting item is a security setting item for completely grasping a print job of a user, and permits print via the CPS 107 alone. Any print job goes through the CPS 107, so that all the print histories of the user are stored into the DB 308 via the print management unit 306. This setting item is activated in a case where a user working remotely prints business documents using a company-provided device.

In each record, the columns 534 to 539 can each have a blank cell. This indicates that such a setting item is not included in the setting information about the record.

In the example of this table, no value is included in the belonging tenant column 532 of the first record (the setting information corresponding to the ID represented by "0" in the ID column 531). This indicates that this setting information does not belong to a specific tenant, and can be referred to from all tenants as common setting information in the CPS 107.

Here, a setting item is allocated to each of the column 534 and subsequent columns of this table, but there may be used a configuration of storing the substance of a setting information file created in a form to be described below with reference to FIG. 6. Instead of the substance, a path to the substance may be stored. In this case, a configuration in which the substance is placed as a file in a different location is used.

FIG. 5C illustrates a serial number management table 550, and consists of columns 551 to 553.

The column 551 is a serial number column. The serial number of a device registered with the CPS 107 is stored in the serial number column 551. The column 552 is a belonging tenant column. A value representing a tenant to which the device having the serial number stored in the serial number column 551 belongs is stored in the belonging tenant column 552. The column 553 is a registration attribute column.

The registration attribute column 553 stores an attribute when the device having the serial number stored in the serial number column 551 is registered with each tenant. A value that can be taken as the registration attribute is "company" or "individual". When the registration attribute is "company", this indicates that the corresponding device is a company-provided device. On the other hand, when the registration attribute is "individual", this indicates that the corresponding device is a device owned by an individual (i.e., a personal device).

Here, a case where a company-provided device is connected to the CPS 107 is considered. The administrator (a user corresponding to "admin" stored as the value of the role in the role column 514) of each tenant of the CPS 107 can recognize the serial number of the company-provided device, before the device is connected to the CPS 107.

Thus, it is desirable for the administrator of each tenant of the CPS 107 to register the serial number of the company-provided device in this table, and set an appropriate value in each of the columns 552 and 553, before the company-provided device is connected to the CPS 107. On the other hand, in a case where a personal device is connected to the CPS 107, the administrator of each tenant of the CPS 107 cannot recognize the serial number of the device beforehand. Thus, the personal device is not registered beforehand in this table.

FIG. 5D illustrates a setting information allocation table 570, and consists of columns 571 to 573. This table is intended to manage setting information corresponding to a registration attribute for each tenant.

The column 571 is a belonging tenant column, and is similar to the column 552. The column 572 is a registration attribute column, and is similar to the column 553. The column 573 is a setting information column. The setting information column 573 stores setting information supposed to be set for a device based on the value of the tenant in the belonging tenant column 571 and the registration attribute in the registration attribute column 572.

In this column, a value in the ID column 531 of the setting information management table 530 is stored, but a form of storing a path to the substance of the setting information or the substance may be used.

Figure 6:
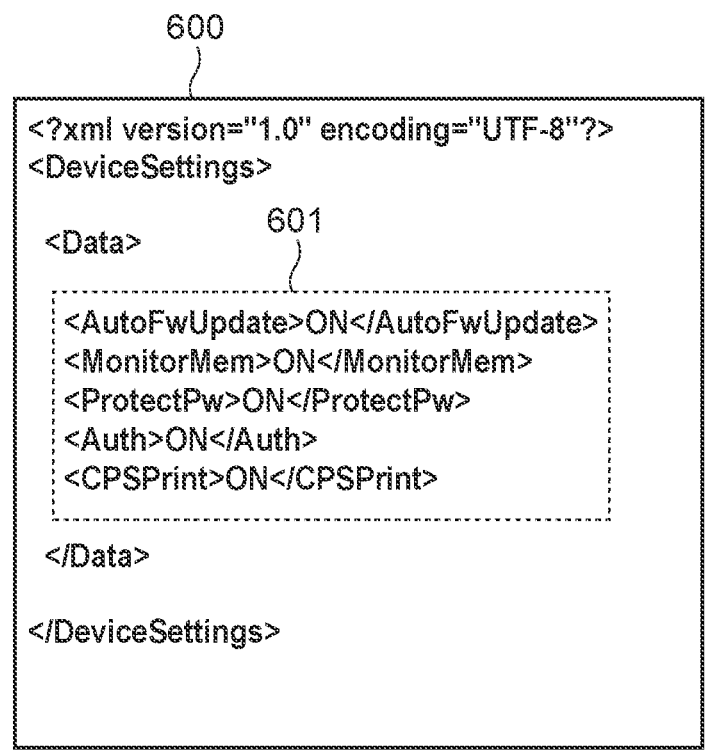
FIG. 6 illustrates an example of a setting information file.

FIG. 6 illustrates a setting information file used in the present exemplary embodiment. In this diagram, a file 600 is an example of a setting information file in an Extensible Markup Language (XML) format.

In a setting information area 601, setting information to be set in a device is enumerated. In the present exemplary embodiment, tags representing the setting items in the columns 534 to 539 of the setting information management table 530 and values of the tags are enumerated.

In the present exemplary embodiment, a data file is expressed in an XML format, but may be expressed, for example, in a JavaScript Object Notation (JSON) format.

FIGS. 7A to 7C each illustrate an example of a UI screen of the UI control unit 301 of the CPS program 300.

FIG. 7A illustrates an edit screen 700. The administrator of each tenant of the CPS 107 uses this screen to create setting information to be applied to a device to be connected to the CPS 107.

In this screen, an area 701 indicates a tenant. The UI control unit 301 acquires a belonging tenant name associated with an account used in logging in to the CPS 107 from the belonging tenant column 512, and displays the acquired belonging tenant name. An area 702 is a setting name input area. The UI control unit 301 acquires the name of setting information to be edited from the setting name column 533, and displays the acquired name.

Areas 703, 704, 705, 706, 707, and 708 are input areas for firmware (FW) automatic update, memory monitoring, password (PW) protection, personal authentication, hold printing, and CPS print only, respectively. These areas correspond to the columns 534 to 539 of the setting information management table 530. A check box is added to the head of each setting item, allowing the user to select a setting item that the user wishes to add to the setting information.

A button 709 is an OK button. When this button is pressed, the CPS program 300 stores an edit result into the setting information management table 530, and closes the edit screen 700. If the user has input a new setting name in the setting name input area 702, the DB management unit 307 adds a new record to the setting information management table 530 and stores various types of information, when this button is pressed.

A button 710 is a cancel button. When this button is pressed, the CPS program 300 discards an edit result on the edit screen 700, and closes the edit screen 700.

FIG. 7B illustrates a registration screen 720. The administrator of each tenant of the CPS 107 uses this screen to register the serial number of a company-provided device in advance.

In this screen, an area 721 indicates a belonging tenant. The displayed content is similar to that in the area 701, and thus the description thereof will be omitted. An area 722 is a serial number input area. The user inputs the serial number of a device to be registered with the tenant in the area 721, in this area. The serial number to be input in this area is the serial number of a company-provided device.

A button 723 is an OK button. When this button is pressed, the CPS program 300 adds a new record to the serial number management table 550, and stores the value of the serial number input area 722 into the serial number column 551. The CPS program 300 also stores "company" indicating a company-provided device into the registration attribute column 553. Afterward, the CPS program 300 closes the registration screen 720. A button 724 is a cancel button. When this button is pressed, the CPS program 300 discards an edit result on the registration screen 720 and closes the registration screen 720.

FIG. 7C illustrates an allocation screen 740. The administrator of each tenant of the CPS 107 uses this screen to allocate setting information to be applied to a company-provided device and a personal device.

In this screen, an area 741 indicates a tenant. The displayed content is similar to that in the area 701, and thus the description thereof will be omitted.

An area 742 is a company device setting information input area. The user inputs setting information to be applied to a company-provided device in this area. In the present exemplary embodiment, a form of inputting a setting name in the setting name column 533 of the setting information management table 530 is illustrated, but this area is not limited thereto, and may be in a form of inputting another value if the setting information is uniquely identified. Further, in the present exemplary embodiment, a plurality of pieces of setting information can be input, and this indicates that a combination of a plurality of pieces of setting information can be applied to a device.

An area 743 is a personal device setting information input area. This area is similar to the area 742 except that, instead of setting information for a company-provided device, setting information for a personal device is input, and thus the description thereof will be omitted.

A button 744 is an OK button. When this button is pressed, the CPS program 300 stores the value of the company device setting information input area 742, into the setting information column 573, for a record having "company" as a value in the registration attribute column 572 in the corresponding tenant in the setting information allocation table 570. Similarly, the CPS program 300 stores the value of the personal device setting information input area 743, into the setting information column 573, for a record having "individual" as a value in the registration attribute column 572. Afterward, the CPS program 300 closes the allocation screen 740. A button 745 is a cancel button. When this button is pressed, the CPS program 300 discards an edit result on the allocation screen 740, and closes the allocation screen 740.

FIG. 8 is a flowchart illustrating processing performed by the CPS program 300 when a user logs in to the CPS 107 using an account having administrator privilege to register the device 102 with the CPS 107. The processing in this flowchart is advance preparation processing performed before registration processing for registering a company-provided device or a personal device with the CPS 107 is performed.

In step S801, the UI control unit 301 determines whether a request to edit setting information is accepted. If the request is determined to be accepted (YES in step S801), the processing proceeds to step S802. Otherwise (NO in step S801), the processing proceeds to step S803.

In step S802, the UI control unit 301 displays the edit screen 700. When the user presses the OK button 709 after creating or editing the setting information, the UI control unit 301 stores the setting information created or edited by the user, into the setting information management table 530 of the DB 308 via the DB management unit 307.

In step S803, the UI control unit 301 determines whether a request for advance registration of a company-provided device is accepted.

If the request is determined to be accepted (YES in step S803), the processing proceeds to step S804. Otherwise (NO in step S803), the processing proceeds to step S805.

In step S804, the UI control unit 301 displays the registration screen 720. When the user presses the OK button 723 after inputting the serial number of a company-provided device, the UI control unit 301 stores the serial number input by the user and a registration attribute value "company" into the serial number management table 550 of the DB 308 via the DB management unit 307.

In step S805, the UI control unit 301 determines whether an allocation request to allocate the created setting information to a registration attribute value "company" or "individual" is accepted. If the request is determined to be accepted (YES in step S805), the processing proceeds to step S806. Otherwise (NO in step S805), the processing in this flowchart ends.

In step S806, the UI control unit 301 displays the allocation screen 740. When the user presses the OK button 744 after allocating the setting information to the input area 742 and the input area 743, the UI control unit 301 stores the allocated information input by the user into the setting information allocation table 570 of the DB 308 via the DB management unit 307. This ends the description of this flowchart.

Figure 9:
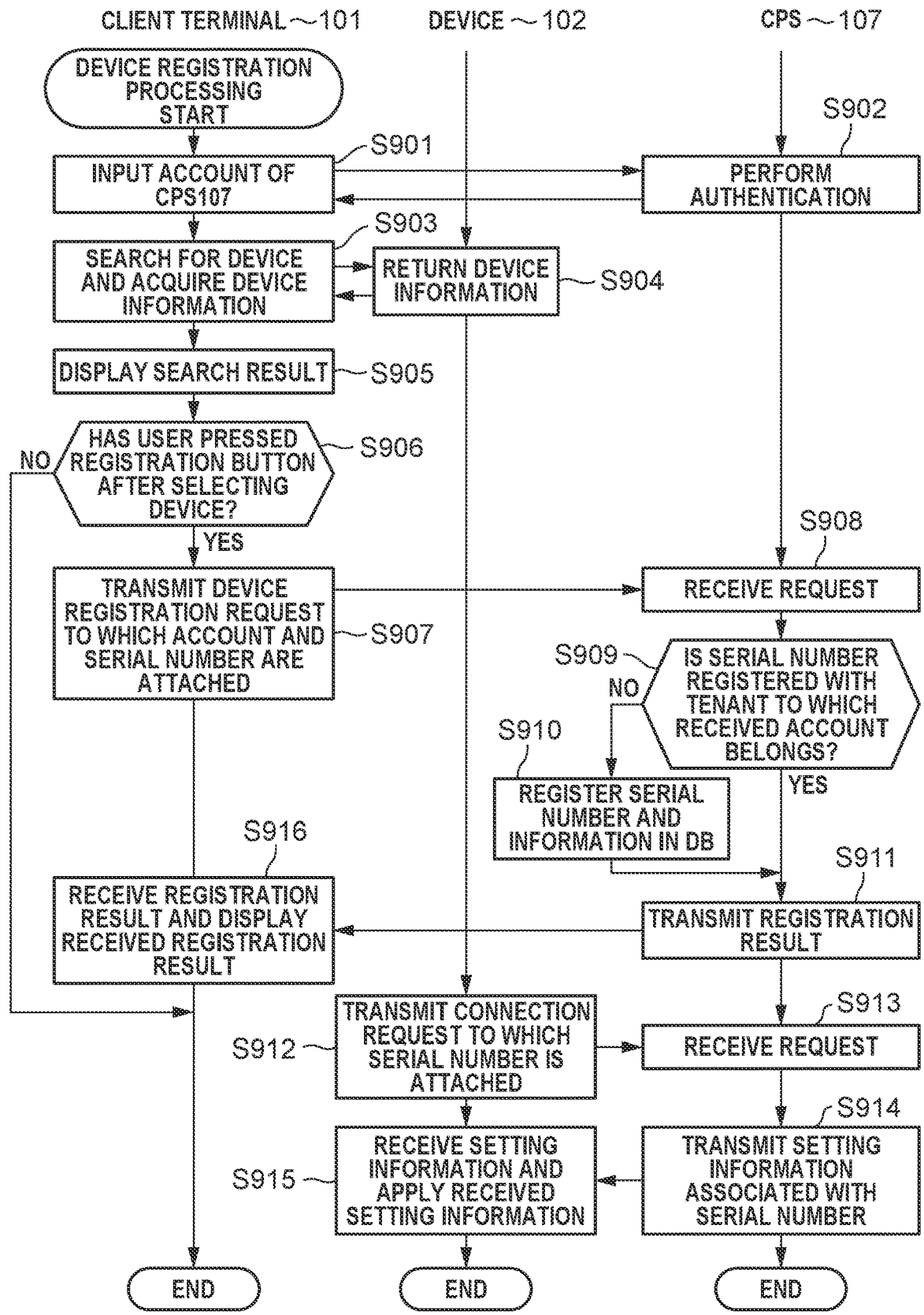
FIG. 9 is a flowchart illustrating device registration processing for registration with the CPS according to the first exemplary embodiment.
Figure 10:
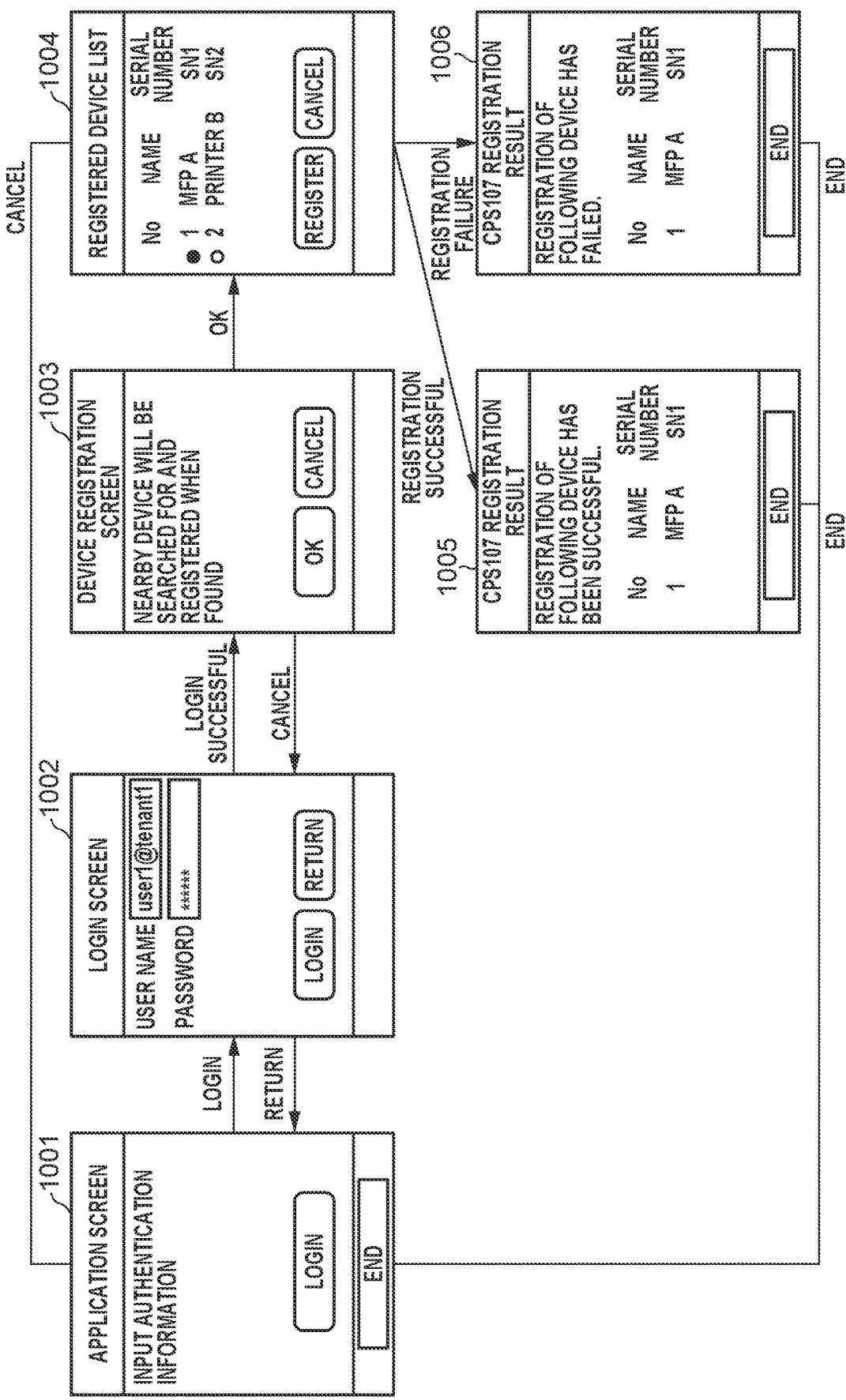
FIG. 10 illustrates examples of a UI screen of a registration application according to the first exemplary embodiment.

Next, device registration processing for registration with the CPS 107 will be described with reference to FIG. 9 and FIG. 10. A user who will register a device starts a registration application as illustrated in FIG. 10 on the client terminal 101, so that the device registration processing for registration with the CPS 107 begins. When the registration application is started, an application screen 1001 first appears.

When the user presses a login button on the application screen 1001, the registration application displays a login screen 1002. In step S901, the user inputs an account and a password each into the corresponding predetermined area on the login screen 1002, and when the user presses a login button, authentication information is transmitted to the CPS 107. In step S902, upon receiving the authentication information from the client terminal 101, the CPS 107 performs authentication based on the received authentication information, using the authentication information management table 510, determines whether the authentication is successful, and transmits the result to the client terminal 101.

If the authentication is successful, the registration application of the client terminal 101 displays a device registration screen 1003. In step S903, when the user presses an OK button in this screen, the registration application searches for a device connected to the network. Search processing can be performed using Simple Network Management Protocol (SNMP), but other protocols including near field communication (NFC) can also be used. In step S904, upon receiving a search request, the device 102 returns device information. The returned device information includes at least the serial number. In addition, a device name, a model ID for uniquely identifying a model, and network information, such as an IP address, can also be included. In step S905, upon receiving the device information returned by the device 102, the registration application displays the search result in a registered device list screen 1004. Here, two devices in the names "MFP A" and "printer B" are displayed as the search result.

Subsequently, in step S906, the registration application determines whether the user has pressed a registration button after selecting a registration target device on the registered device list screen 1004. If the registration button is pressed (YES in step S906), the processing proceeds to step S907. On the other hand, if a cancel button is pressed by the user (NO in step S906), the processing in this flowchart ends.

In step S907, upon the press of the registration button on the registered device list screen 1004, the registration application transmits a device registration request to the CPS 107. At least the account input in step S901 and the serial number received in step S905 are transmitted to the CPS 107.

In step S908, the CPS 107 receives the device registration request. Subsequently, in step S909, the CPS 107 determines whether the received serial number is registered with the tenant to which the received account belongs. Specifically, the CPS 107 checks whether the received serial number is registered in the serial number management table 550. If the serial number is registered (YES in step S909), the processing proceeds to step S911. Otherwise (NO in step S909), the processing proceeds to step S910.

In step S910, the CPS 107 registers the received serial number and accompanying information in the serial number management table 550. Specifically, the CPS 107 adds a new record to this table, and the CPS 107 stores the received serial number into the serial number column 551. The CPS 107 stores the value (the value in the belonging tenant column 512) of the tenant to which the received account belongs into the belonging tenant column 552. The CPS 107 stores "individual" into the registration attribute column 553. A case where the received serial number is not registered in this table indicates that the device having this serial number is not a company-provided device.

Thus, "individual" can be stored in the registration attribute column 553.

In step S911, the CPS 107 transmits a notification indicating the registration result to the client terminal 101. If the serial number of the registration target device is registered in the serial number management table 550 when this step is performed, the registration result is "successful". If the serial number of the registration target device is not registered in the serial number management table 550 for a reason, such as an error in access to the DB 308, the registration result is "failure".

In step S916, the registration application of the client terminal 101 receives the registration result from the CPS 107, and displays a registration result screen 1005 (if the registration is successful) or a registration result screen 1006 (in a case where the registration fails), as the result of the registration of the device 102 with the CPS 107.

In step S912, the device 102 transmits a connection request to the CPS 107, based on an operation by the user who has confirmed that the registration with the CPS 107 is successful. The serial number of the device 102 is attached to the connection request. The connection request is generally called "communication test" or "connection test", and is intended to confirm that the device can communicate with the CPS 107.

In step S913, the CPS 107 receives the connection request from the device 102. In step S914, the CPS 107 transmits setting information associated with the received serial number to the device 102, using the serial number management table 550 and the setting information allocation table 570. Specifically, the CPS 107 extracts the value of a belonging tenant and a registration attribute based on the received serial number, using the serial number management table 550. Further, the CPS 107 acquires the setting information corresponding to the belonging tenant and the registration attribute, using the setting information allocation table 570. The setting information column 573 can include a plurality of pieces of setting information (e.g., the first record of the setting information allocation table 570). In this case, two pieces of setting information may be directly transmitted to the device 102, or a plurality of pieces of setting information may be transmitted after being merged into one. When pieces of setting information are merged into one, one setting information file may be created from a plurality of setting information files in the form exemplified by the file 600 in FIG. 6.

In step S915, the device 102 receives the setting information from the CPS 107, and applies the received setting information to itself after determining that the connection state with the CPS 107 is "successful". The setting information is reflected in the setting information about the MFP control program 401 of the device 102, through the setting management service 405. If a plurality of pieces of setting information is transmitted from the CPS 107, the reflection processing through the setting management service 405 is performed a plurality of times. This ends the description of this flowchart.

The CPS 107 can distinguish between a company-provided device and a personal device by performing step S909 and step S910 of the first exemplary embodiment described above.

In addition, carrying out step S912 to step S915 allows application of appropriate setting information to the device 102, regardless of whether the device 102 is a company-provided device or a personal device, and thus a user working remotely can always perform print based on appropriate device settings.

A second exemplary embodiment will be described. In the first exemplary embodiment, the CPS 107 unconditionally registers a personal device for which registration is requested by a user working remotely.

However, there is a case where the administrator of a tenant of the CPS 107 requests a device that connects to its own tenant to have a minimum security function (e.g., an automatic FW update function).

In the present exemplary embodiment, an example will be described in which only a device having a minimum security function can be registered, when a user working remotely requests a CPS 107 to register a personal device owned by the user. The part different from the first exemplary embodiment will be mainly described.

FIGS. 11A to 11C each illustrate an example of a table managed in the CPS 107 according to the present exemplary embodiment. A table configuration in each of FIGS. 11A to 11C is an example, and a table configuration different from this example may be used.

FIG. 11A illustrates a security function table 1100 consisting of columns 1101 to 1105. One record represents security functions that one model has.

The column 1101 is a model ID column, and indicates an identifier for uniquely identifying the model of a device.

The columns 1102 to 1105 each indicate a security function that a device can have. Here, the column 1102 indicates a FW protection function, the column 1103 indicates a FW automatic update function, the column 1104 indicates a PW protection function, and the column 1105 indicates a port control function. The security function is not limited to the examples described here.

Whether each model indicated by a model ID has the security function indicated by each column is stored as a value of each column in each record. Here, "AVAILABLE" is stored if a model has the security function, and "NOT AVAILABLE" is stored if a model does not have the security function.

FIG. 11B illustrates an indispensable function table 1120 consisting of columns 1121 to 1125. One record represents indispensable functions of one tenant. The column 1121 is a belonging tenant column. This column stores values similar to the values stored in the belonging tenant column 512.

The columns 1122 to 1125 indicate security functions that a device can have. Typically, these columns store the same security functions as the security functions of the security function table 1100.

Whether the security function represented by each column in each belonging tenant is indispensable is stored as a value of each column in each record. A person who determines whether the security function is indispensable and inputs the value in this table is the administrator of a tenant. Here, "APPLICABLE" is stored if a security function is indispensable, and "NOT APPLICABLE" is stored otherwise.

FIG. 11C illustrates a model ID correspondence table 1140 consisting of columns 1141 and 1142. One record represents the range of serial numbers allocated to one model. The column 1141 is a model ID column, and stores the same values as the values in the column 1101. The column 1142 is a serial number range column, and stores the range of serial numbers allocated to the model having a model ID. Here, consecutive serial numbers are allocated to a model, but discrete serial numbers may be allocated.

The administrator of the CPS 107 inputs beforehand a security function that each model has, into the security function table 1100. Further, the administrator inputs beforehand the range of serial numbers allocated to each model, into the model ID correspondence table 1140. Furthermore, a tenant administrator of the CPS 107 inputs beforehand a security function indispensable to its own tenant, into the indispensable function table 1120.

Figure 12:
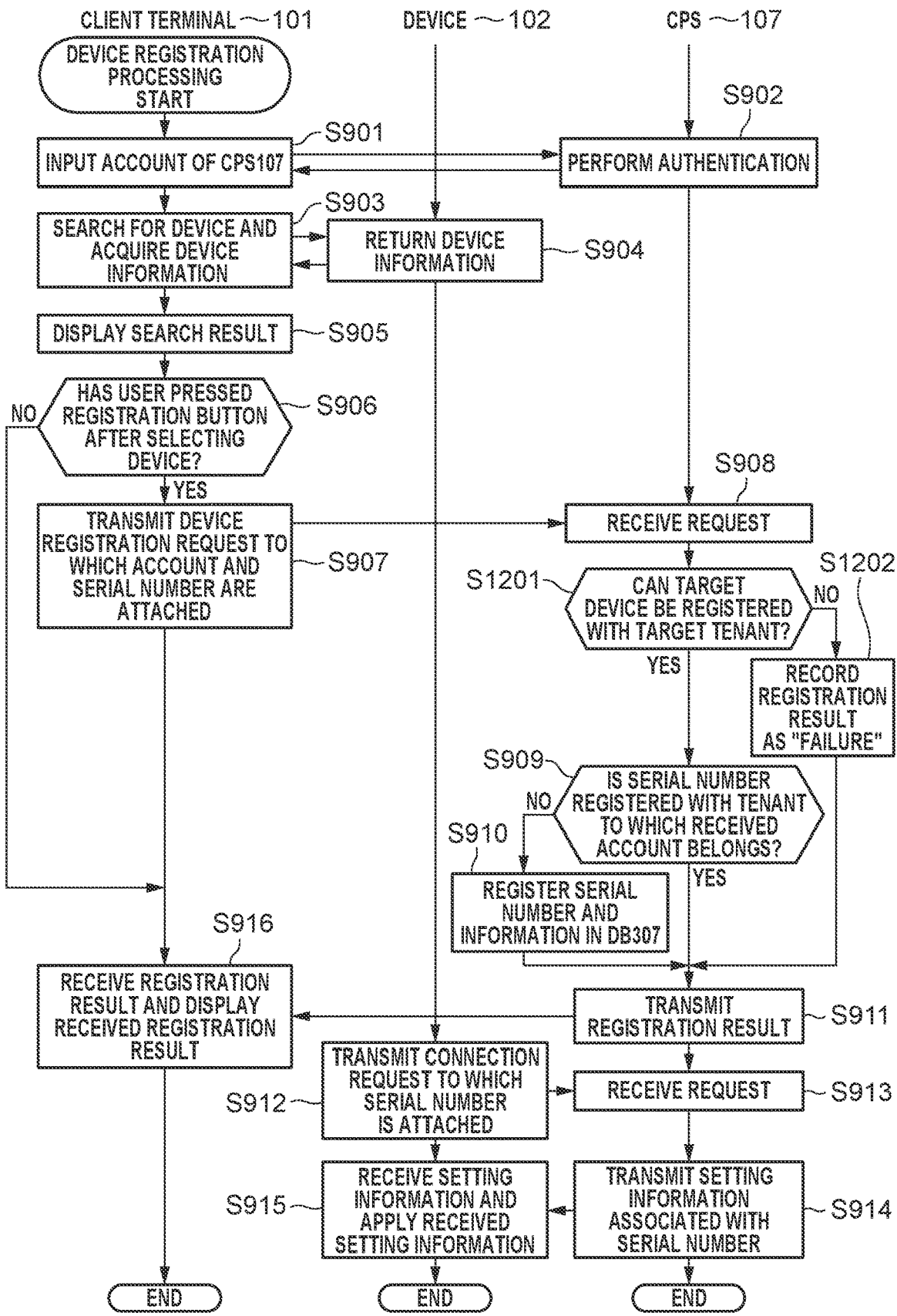
FIG. 12 is a flowchart illustrating device registration processing for registration with the CPS according to the second exemplary embodiment.

Afterward, when a user who will register a device starts a registration application similar to the application described with reference to FIG. 10 on a client terminal 101, device registration processing for registration with the CPS 107 illustrated in FIG. 12 begins.

Step S901 to step S908 are similar to those of the processing described in the first exemplary embodiment, and thus the description thereof will be omitted.

In step S1201 subsequent to step S908, the CPS 107 determines whether the target device can be registered with the target tenant, using an account and a serial number received in step S908. Specifically, the CPS 107 identifies the model ID based the received serial number, using the model ID correspondence table 1140. Next, the CPS 107 identifies a security function that the model of the identified model ID has, using the security function table 1100. Finally, the CPS 107 identifies the belonging tenant based on the received account, and subsequently examines whether the registration target model has all functions indispensable to the tenant, using the indispensable function table 1120. If the registration target model has all the indispensable functions, the CPS 107 determines that the registration is possible.

For example, if the received serial number is "SN11" and the received account is "user1 @tenant1", the model ID can be identified as "model1", and the belonging tenant can be identified as "tenant1". The security functions that the model1 has are all the functions in the columns 1102 to 1105, and thus it can be found that the device having "SN11" as the serial number can be registered with the tenant1, by referring to the indispensable function table 1120.

If the CPS 107 determines that the target device can be registered (YES in step S1201), the processing proceeds to step S909. Otherwise (NO in step S1201), the processing proceeds to step S1202. In step S1202, the CPS 107 records the registration result as "failure".

Step S909 to step S916 performed thereafter are similar to those of the processing described in the first exemplary embodiment, and thus the description thereof will be omitted. If the registration result is "failure", the CPS 107 returns an error to a connection request transmitted in step S912. This ends the description of this flowchart.

The CPS 107 can register only a device having a minimum security function determined for each tenant, by performing step S1201 and step S1202 according to the second exemplary embodiment described above.

In the present exemplary embodiment, the CPS 107 finds a model ID based on a serial number using the model ID correspondence table 1140, but a form may be used in which the CPS 107 does not have this table and the client terminal 101 also attaches a model ID in step S907. In that case, typically, the client terminal 101 obtains the model ID from a device 102 in step S904.

Other Exemplary Embodiments

Some embodiments also include an apparatus or system configured by appropriately combining the above-described exemplary embodiments, and a method thereof.

Here, some embodiments are an apparatus or system to be an entity that runs one or more pieces of software (programs) implementing the functions of the above-described exemplary embodiments. Further, a method for implementing the above-described exemplary embodiments executed by the apparatus or system is also included in some embodiments. Furthermore, one or more programs are supplied to a system or apparatus via a network or any of various storage mediums, and are read out into one of more memories by one or more computers (such as a CPU and a micro processing unit (MPU)) of the system or apparatus. In other words, some embodiments also include the one or more programs, and various storage mediums readable by a computer storing the one or more programs. Moreover, some embodiments can be implemented by a circuit (e.g., an application specific integrated circuit (ASIC)) that implements the functions of the above-described exemplary embodiments.

According to the present exemplary embodiments, a mechanism can be provided in which, even when a print apparatus owned by an employee and also used for work is connected to a print service, settings not causing inconvenience to the way of using the print apparatus as a personal device can be applied to the print apparatus.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-042416, which was filed on Mar. 17, 2022 and which is hereby incorporated by reference herein in its entirety.

What is claimed is:

1. A print management system comprising:
one or more memories; and
one or more processors in communication with the one or more memories, wherein the one or more processors and the one or more memories are configured to:
receive a registration request for registration of a print apparatus, including an identifier for identifying the print apparatus, from an information processing apparatus;
register, in a case where the identifier included in the registration request is unregistered in association with an account through which the registration request has been made, the identifier with a database in association with the account;
receive a request including the identifier for identifying the print apparatus from the print apparatus; and
transmit first setting information as setting information to be applied to the print apparatus to the print apparatus, in a case where the identifier included in the registration request is registered in association with the account when the registration request is made, wherein, in a case where the identifier included in the registration request is unregistered in association with the account when the registration request is made, the one or more processors and the one or more memories are further configured to transmit second setting information different from the first setting information as the setting information to be applied to the print apparatus to the print apparatus.

2. The print management system according to claim 1, wherein, in a case where the identifier included in the registration request is unregistered in association with the account when the registration request is made, and the print apparatus is used for remote work, the one or more processors and the one or more memories are further configured to transmit the second setting information as the setting information to be applied to the print apparatus to the print apparatus.

3. The print management system according to claim 1, wherein the second setting information is partial setting information included in the first setting information, and includes at least a setting about firmware automatic update.

4. The print management system according to claim 1, wherein the one or more processors and the one or more memories are further configured to transmit a notification indicating failure of the registration to the print apparatus, without registering the identifier with the database, in a case where the print apparatus corresponding to the identifier included in the registration request does not have a function corresponding to an indispensable setting included in the first setting information and the second setting information.

5. A method in a print management system, the method comprising:

receiving a registration request for registration of a print apparatus, including an identifier for identifying the print apparatus, from an information processing apparatus;

registering, in a case where the identifier included in the registration request is unregistered in association with an account through which the registration request has been made, the identifier with a database in association with the account;

receiving a request including the identifier for identifying the print apparatus from the print apparatus; and transmitting first setting information as setting information to be applied to the print apparatus to the print apparatus, in a case where the identifier included in the registration request is registered in association with the account when the registration request is made, wherein in a case where the identifier included in the registration request is unregistered in association with the account when the registration request is made, second setting information different from the first setting information is transmitted as the setting information to be applied to the print apparatus to the print apparatus.

* * * * *